United States Patent
Schober et al.

(10) Patent No.: US 12,526,113 B2
(45) Date of Patent: Jan. 13, 2026

(54) SEARCH SPACE DESIGN FOR NR-U WB OPERATIONS

(71) Applicant: Nokia Technologies Oy, Espoo (FI)

(72) Inventors: Karol Schober, Helsinki (FI); Esa Tapani Tiirola, Kempele (FI); Timo Erkki Lunttila, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 407 days.

(21) Appl. No.: 17/607,439

(22) PCT Filed: May 3, 2019

(86) PCT No.: PCT/EP2019/061430
§ 371 (c)(1),
(2) Date: Oct. 29, 2021

(87) PCT Pub. No.: WO2020/224749
PCT Pub. Date: Nov. 12, 2020

(65) Prior Publication Data
US 2022/0209919 A1    Jun. 30, 2022

(51) Int. Cl.
*H04L 5/00* (2006.01)

(52) U.S. Cl.
CPC .......... *H04L 5/0053* (2013.01); *H04L 5/0051* (2013.01); *H04L 5/0064* (2013.01); *H04L 5/0094* (2013.01); *H04L 5/0096* (2013.01)

(58) Field of Classification Search
CPC ... H04L 5/0053; H04L 5/0064; H04L 5/0091; H04L 5/0092; H04L 5/0094; H04W 72/23
See application file for complete search history.

(56) References Cited

U.S. PATENT DOCUMENTS

| | | | |
|---|---|---|---|
| 12,127,210 B2* | 10/2024 | Lee | H04W 72/0453 |
| 2010/0254329 A1 | 10/2010 | Pan et al. | |
| 2011/0069637 A1 | 3/2011 | Liu et al. | |
| 2013/0077590 A1 | 3/2013 | Xue et al. | |
| 2013/0114529 A1 | 5/2013 | Chen et al. | |
| 2020/0120720 A1* | 4/2020 | Wu | H04W 72/04 |
| 2021/0092772 A1* | 3/2021 | Nakashima | H04L 5/001 |

(Continued)

FOREIGN PATENT DOCUMENTS

| | | |
|---|---|---|
| CN | 104054290 A | 9/2014 |
| CN | 109075948 A | 12/2018 |
| CN | 109391971 A | 2/2019 |

OTHER PUBLICATIONS

Notice of Allowance received for corresponding European Patent Application No. 19722587.3, dated Oct. 30, 2023, 8 pages.

(Continued)

*Primary Examiner* — Pao Sinkantarakorn
(74) *Attorney, Agent, or Firm* — ALSTON & BIRD LLP (57) ABSTRACT

An apparatus and a method are provided by which a configuration for a set of control resource sets and at least one search space on a bandwidth part is obtained, wherein the bandwidth part comprises at least two sub-bands, each search space is associated with a subset of at least two control resource sets, and at least two control resource sets are on different sub-bands, and mapping and monitoring each search space is performed according to the obtained configuration.

18 Claims, 6 Drawing Sheets

(56) References Cited

U.S. PATENT DOCUMENTS

| | | | |
|---|---|---|---|
| 2021/0399858 A1* | 12/2021 | Yang | H04W 74/0808 |
| 2022/0039158 A1* | 2/2022 | Awadin | H04W 74/0866 |
| 2022/0061094 A1* | 2/2022 | Jung | H04W 72/542 |
| 2022/0078834 A1* | 3/2022 | Wu | H04L 27/0006 |
| 2022/0085931 A1* | 3/2022 | Mondal | H04W 72/23 |

OTHER PUBLICATIONS

Office action received for corresponding Chinese Patent Application No. 201980098091.8, dated Nov. 28, 2023, 11 pages of office action and No. page of translation available.

Yueyou et al., "Resource mapping and performance analysis of EPDCCH in LTE-A systems", Guangdong Communication Technology, No. 07, Jul. 2016, pp. 33-37.

Office Action received for corresponding European Patent Application No. 19722587.3, dated Apr. 3, 2023, 8 pages,.

Office action received for corresponding Vietnamese Patent Application No. 1-2021-07351, dated Sep. 13, 2023, 2 page of office action and 1 page of translation available.

Office Action received for corresponding Indian Patent Application No. 202147055270, dated Mar. 28, 2022, 6 pages.

"Revised SID on NR-based Access to Unlicensed Spectrum", 3GPP TSG RAN Meeting #80, RP-181339, Agenda: 9.4.3, Qualcomm Incorporated, Jun. 11-14, 2018, 5 pages.

"3rd Generation Partnership Project; Technical Specification Group Radio Access Network; Study on NR-based access to unlicensed spectrum (Release 16)", 3GPP TR 38.889, V16.0.0, Dec. 2018, pp. 1-119.

"New WID on NR-based Access to Unlicensed Spectrum", 3GPP TSG RAN Meeting #82, RP-182878, Agenda: 9.1.1, Qualcomm Incorporated, Dec. 10-13, 2018, 8 pages.

"Summary #2 on wide-band operation for NR-U", 3GPP TSG RAN WG1 #96bis, R1-1905779, Agenda: 7.2.2.2.5, LG Electronics, Apr. 8-12, 2019, 22 pages.

"3rd Generation Partnership Project; Technical Specification Group Radio Access Network; NR; NR and NG-RAN Overall Description; Stage 2 (Release 15)", 3GPP TS 38.300, V15.5.0, Mar. 2019, pp. 1-97.

"3rd Generation Partnership Project; Technical Specification Group Radio Access Network; NR; Radio Resource Control (RRC) protocol specification (Release 15)", 3GPP TS 38.331, V15.5.1, Apr. 2019, pp. 1-491.

"3rd Generation Partnership Project; Technical Specification Group Radio Access Network; NR; Physical layer procedures for control (Release 15)", 3GPP TS 38.213, V15.5.0, Mar. 2019, pp. 1-104.

"NRU wideband BWP operation", 3GPP TSG RAN WG1 Meeting #96bis, R1-1903932, Agenda: 7.2.2.2.5, Huawei, Apr. 8-12, 2019, 9 pages.

International Search Report and Written Opinion received for corresponding Patent Cooperation Treaty Application No. PCT/EP2019/061430, dated Jan. 17, 2020, 12 pages.

"On wideband operation in NR-U", 3GPP TSG RAN WG1 Meeting #96bis, R1-1904194, Agenda: 7.2.2.2.5, Nokia, Apr. 8-12, 2019, 15 pages.

"Summary on wide-band operation for NR-U", 3GPP TSG RAN WG1 #96, R1-1903392, Agenda: 7.2.2.2.5, LG Electronics, Feb. 25-Mar. 1, 2019, 16 pages.

Office Action for Indonesian Application No. P00202110809 dated Jan. 18, 2024, 6 pages.

Office Action for Indonesian Application No. P00202110809 dated Aug. 29, 2024, 6 pages.

* cited by examiner

|   | 1 | 2 | 3 | 4 | 5 | 6 | 7 | 8 |
|---|---|---|---|---|---|---|---|---|
| 60 kHz SCS | 20 | 20 | 20 | 20 | 20 | 20 | 20 | 20 |

| 30 kHz SCS | 20 | 20 | 20 | 20 |
|---|---|---|---|---|

| 15 kHz SCS | 20 | 20 |
|---|---|---|

Fig. 3

|  | sub-bands | | | |
|---|---|---|---|---|
|  | a | b | c | d |
| 1 sub-band | x |   |   |   |
|   |   | x |   |   |
|   |   |   | x |   |
|   |   |   |   | x |
| 2 sub-bands | x | x |   |   |
|   |   | x | x |   |
|   |   |   | x | x |
| 3 sub-bands | x | x | x |   |
|   |   | x | x | x |
| 4 sub-bands | x | x | x | x |

Fig. 4

```
-- ASN1START
-- TAG-PDCCH-CONFIG-START

PDCCH-Config ::=              SEQUENCE {
    controlResourceSetToAddModList    SEQUENCE(SIZE (1..3)) OF ControlResourceSet          OPTIONAL,     -- Need N
    controlResourceSetToReleaseList   SEQUENCE(SIZE (1..3)) OF ControlResourceSetId        OPTIONAL,     -- Need N
    searchSpacesToAddModList          SEQUENCE(SIZE (1..10)) OF SearchSpace                OPTIONAL,     -- Need N
    searchSpacesToReleaseList         SEQUENCE(SIZE (1..10)) OF SearchSpaceId              OPTIONAL,     -- Need N
    downlinkPreemption                SetupRelease { DownlinkPreemption }                  OPTIONAL,     -- Need M
    tpc-PUSCH                         SetupRelease { PUSCH-TPC-CommandConfig }             OPTIONAL,     -- Need M
    tpc-PUCCH                         SetupRelease { PUCCH-TPC-CommandConfig }             OPTIONAL,     -- Cond PUCCH-CellOnly
    tpc-SRS                           SetupRelease { SRS-TPC-CommandConfig}                OPTIONAL,     -- Need M
    ...
}

-- TAG-PDCCH-CONFIG-STOP
-- ASN1STOP
```

Fig. 5A

```
-- ASN1START
-- TAG-CONTROLRESOURCESET-START

ControlResourceSet ::=           SEQUENCE {
    controlResourceSetId,        ControlResourceSetId, frequencyDomainResources  BIT STRING (SIZE (45)),
    duration                  INTEGER (1..maxCoReSetDuration),
    cce-REG-MappingType       CHOICE {
        interleaved               SEQUENCE {
            reg-BundleSize            ENUMERATED {n2, n3, n6},
            interleaverSize           ENUMERATED {n2, n3, n6},
            shiftIndex                INTEGER(0..maxNrofPhysicalResourceBlocks-1)    OPTIONAL -- Need S
        },
        nonInterleaved            NULL
    },
    precoderGranularity        ENUMERATED { sameAsREG-bundle, allContiguousRBs},
    tci-StatesPDCCH-ToAddList       SEQUENCE(SIZE (1..maxNrofTCI-StatesPDCCH)) OF TCI-StateId OPTIONAL, -- Cond NotSIB1-initialBWP
    tci-StatesPDCCH-ToReleaseList   SEQUENCE(SIZE (1..maxNrofTCI-StatesPDCCH)) OF TCI-StateId OPTIONAL, -- Cond NotSIB1-initialBWP
    tci-PresentInDCI           ENUMERATED {enabled}                          OPTIONAL, -- Need S
    pdcch-DMRS-ScramblingID    INTEGER (0..65535)                            OPTIONAL, -- Need S
    ...
}

-- TAG-CONTROLRESOURCESET-STOP
-- ASN1STOP
```

Fig. 5B

```
-- ASN1START
-- TAG-SEARCHSPACE-START

SearchSpace ::=             SEQUENCE {
    searchSpaceId               SearchSpaceId,
    controlResourceSetId        ControlResourceSetId                OPTIONAL,   -- Cond SetupOnly
    monitoringSlotPeriodicityAndOffset  CHOICE {
        sl1                         NULL,
        sl2                         INTEGER (0..1),
        sl4                         INTEGER (0..3),
        sl5                         INTEGER (0..4),
        sl8                         INTEGER (0..7),
        sl10                        INTEGER (0..9),
        sl16                        INTEGER (0..15),
        sl20                        INTEGER (0..19),
        sl40                        INTEGER (0..39),
        sl80                        INTEGER (0..79),
        sl160                       INTEGER (0..159),
        sl320                       INTEGER (0..319),
        sl640                       INTEGER (0..639),
        sl1280                      INTEGER (0..1279),
        sl2560                      INTEGER (0..2559)
    }                                                               OPTIONAL,   -- Cond Setup
    duration                    INTEGER (2..2559)                   OPTIONAL,   -- Need R
    monitoringSymbolsWithinSlot BIT STRING (SIZE (14))              OPTIONAL,   -- Cond Setup
```

Fig. 5C

SEARCH SPACE DESIGN FOR NR-U WB OPERATIONS

RELATED APPLICATION

This application claims priority to PCT Application No. PCT/EP2019/061430, filed on May 3, 2019, each of which is incorporated herein by reference in its entirety.

FIELD OF THE INVENTION

The present invention relates to an apparatus, a method and a computer program product by which an improved search space design for NR-U wideband (WB) operations can be achieved.

RELATED BACKGROUND ART

The following meanings for the abbreviations used in this specification apply:
BW Bandwidth
BWP Bandwidth part
CCA Clear Channel Assessment
CCE Control channel element
CORESET Control resource set
COT Channel occupancy time
DCI Downlink Control Information
DL Downlink
DMRS Demodulation reference signal
FFT Fast Fourier Transformation
GC-PDCCH Group-common PDCCH
gNB NR node B
IE Information Element
LBT Listen-before-talk
NR New Radio
NR-U NR unlicensed
PDCCH Physical Downlink Control Channel
REG Resource element group
SS Search space
TCI Transmission configuration indication
UE User Equipment
WB Wideband Example embodiments, although not limited to this, relate NR unlicensed (NR-U), and in particular with a physical layer design of NR-U. More specifically, it is focused on DL control signalling aspects of NR-U operating on a carrier comprising of multiple LBT sub-bands (typically 20 MHz each).

In NR-U, it is required that a gNB carries out an LBT (listen before talk) process before actually transmitting a signal on a certain channel. When a bandwidth part (BWP) is divided into sub-bands, in NR-U these sub-bands, on which the LBT process is to be carried out, are referred to as LBT sub-bands.

In a LBT process or in a Clear Channel Assessment (CCA), a channel is measured to be vacant (or idle or unoccupied) if the energy measured on the channel within a measurement period is below an energy threshold. Correspondingly, a channel is measured to be occupied if the energy measured on the channel within a measurement period is above an energy threshold. The energy threshold is predetermined and may depend e.g. on the intended transmission power. For all Categories of LBT CCA is performed, except for Category 1 LBT.

The outcome of the LBT process may be that LBT is successful only on parts (of LBT sub-bands) of a configured BWP, and that the gNB is not allowed to transmit on other parts. This affects transmission of PDCCH in downlink.

In particular, in NR-U, for obtaining control information, an UE has to search for a PDCCH sent from the gNB.

Hence, it is advantageous to provide an efficient search strategy and the related arrangement for PDCCH in NR-U.

SUMMARY OF THE INVENTION

Example embodiments of the present invention address this situation and aim to provide measures for providing an efficient search strategy and the related arrangement for a PDCCH in NR-U.

According to a first aspect, an apparatus is provided which comprises at least one processor and at least one memory including computer program code, the at least one memory and the computer program code configured to, with the at least one processor, cause the apparatus at least to perform: obtaining a configuration for a set of control resource sets and at least one search space on a bandwidth part, wherein the bandwidth part comprises at least two sub-bands, each search space is associated with a subset of at least two control resource sets, and at least two control resource sets are on different sub-bands, and mapping and monitoring each search space according to the obtained configuration.

According to a second aspect, a method is provided which comprises:
  obtaining, at a user equipment, a configuration for a set of control resource sets and at least one search space on a bandwidth part, wherein the bandwidth part comprises at least two sub-bands, each search space is associated with a subset of at least two control resource sets, and at least two control resource sets are on different sub-bands, and
  mapping and monitoring each search space according to the obtained configuration.

The first and second aspects may be modified as follows:
The mapping and monitoring may be performed for each monitoring occasion of the search space, separately for each channel occupancy time.

The sub-bands within the transmission bandwidth of a channel occupation time of a network control element may be determined based on an indication received from the network control element and/or by detecting a downlink demodulation reference signal.

The indication received from the network control element may be a group-common physical downlink control channel, and the search space carrying the group-common physical downlink control channel may be mapped to all associated control resource sets.

The control resource sets that a certain search space is associated with may be ranked based on a priority.

It may be determined on which of the one or more associated control resource sets to map and monitor a certain search space depending on the sub-bands within the transmission bandwidth of a channel occupation time of the network control element.

The association of the search space to the control resource sets may depend on a combination of sub-bands that the network control element transmits, and a certain search space may be mapped to a control resource set with the highest priority among transmitted associated control resource sets.

The associated control resource sets may be defined for certain search space and the number thereof may be smaller than the number of sub-bands of the bandwidth part, and the certain search space may be dropped when these control resource sets are not available.

A search space may be associated with multiple control resource sets, and mapping and monitoring the search space may be performed on all associated control resource sets if the network control element is transmitting on the sub-band corresponding to the control resource set, and/or if the number of the sub-bands, on which the network control element transmits, is equal to one of the numbers configured for the search space or equal to the number configured for the search space.

Associated control resource sets may share a set of common parameters. Moreover, the associated control resource sets may differ only in a frequency domain location within the bandwidth part.

Different mapping and monitoring strategies may be applied for different search spaces.

The configuration may be obtained by receiving the configuration from a network control element.

According to a third aspect, an apparatus is provided which comprises at least one processor and at least one memory including computer program code, the at least one memory and the computer program code configured to, with the at least one processor, cause the apparatus at least to perform: preparing a configuration for a set of control resource sets and at least one search space on a bandwidth part, wherein the bandwidth part comprises at least two sub-bands, each search space is associated with a subset of at least two control resource sets, and at least two control resource sets are on different sub-bands, and sending the configuration to a user equipment.

According to a fourth aspect, a method is provided which comprises:
  preparing, in a network control element, a configuration for a set of control resource sets and at least one search space on a bandwidth part, wherein the bandwidth part comprises at least two sub-bands, each search space is associated with a subset of at least two control resource sets, and at least two control resource sets are on different sub-bands, and
  sending the configuration to a user equipment.

The third and fourth aspects may be modified as follows:
The following may be performed:
  detecting whether a channel is vacant,
  determining, when it is detected that a channel is vacant for at least one sub-band, that a channel occupancy time has started,
  determining a transmission bandwidth for the current channel occupancy time,
  determining an association between search space and control resource set for at least one search space and the user equipment, and
  transmitting at least one physical downlink control channel for the user equipment based on the determined association between search space and control resource set.

The control resource sets that the search spaces are associated with may be ranked based on a priority.

The associated control resources sets may share a set of common parameters. Moreover, the associated control resource sets may differ only in a frequency domain location within the bandwidth part.

According to an fifth aspect of the present invention a computer program product is provided which comprises code means for performing a method according to any one of the second and fourth aspects and/or their modifications when run on a processing means or module. The computer program product may be embodied on a computer-readable medium, and/or the computer program product may be directly loadable into the internal memory of the computer and/or transmittable via a network by means of at least one of upload, download and push procedures.

According to a sixth aspect an apparatus is provided which comprises means for obtaining a configuration for a set of control resource sets and at least one search space on a bandwidth part, wherein the bandwidth part comprises at least two sub-bands, each search space is associated with a subset of at least two control resource sets, and at least two control resource sets are on different sub-bands, and means for mapping and monitoring each search space according to the obtained configuration.

According to a seventh aspect an apparatus is provided which comprises means for preparing a configuration for a set of control resource sets and at least one search space on a bandwidth part, wherein the bandwidth part comprises at least two sub-bands, each search space is associated with a subset of at least two control resource sets, and at least two control resource sets are on different sub-bands, and means for sending the configuration to a user equipment.

BRIEF DESCRIPTION OF THE DRAWINGS

These and other objects, features, details and advantages will become more fully apparent from the following detailed description of example embodiments of the present invention which is to be taken in conjunction with the appended drawings, in which.

DETAILED DESCRIPTION OF EXAMPLE EMBODIMENTS

In the following, description will be made to example embodiments of the present invention. It is to be understood, however, that the description is given by way of example only, and that the described example embodiments are by no means to be understood as limiting the present invention thereto.

Before describing example embodiments in detail, the problem underlying the present application is described in some more detail. As mentioned above, example embodiments relate to searching for a PDCCH in NR-U.

First, as a background, PDCCH operation in NR-Rel-15 is described.

PDCCH operation in NR licensed band operation in explained at high level in TS 38.300.

As described in chapter 5.2.3 of TS 38.300 (Physical downlink control channels), the Physical Downlink Control Channel (PDCCH) can be used to schedule DL transmissions on PDSCH and UL transmissions on PUSCH, where the Downlink Control Information (DCI) on PDCCH includes:

Downlink assignments containing at least modulation and coding format, resource allocation, and hybrid-ARQ information related to DL-SCH;

Uplink scheduling grants containing at least modulation and coding format, resource allocation, and hybrid-ARQ information related to UL-SCH.

A UE monitors a set of PDCCH candidates in the configured monitoring occasions in one or more configured COntrol REsource SETs (CORESETs) according to the corresponding search space configurations.

A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET.

Polar coding is used for PDCCH.

Each resource element group carrying PDCCH carries its own DMRS.

QPSK modulation is used for PDCCH.

Figure 5A:
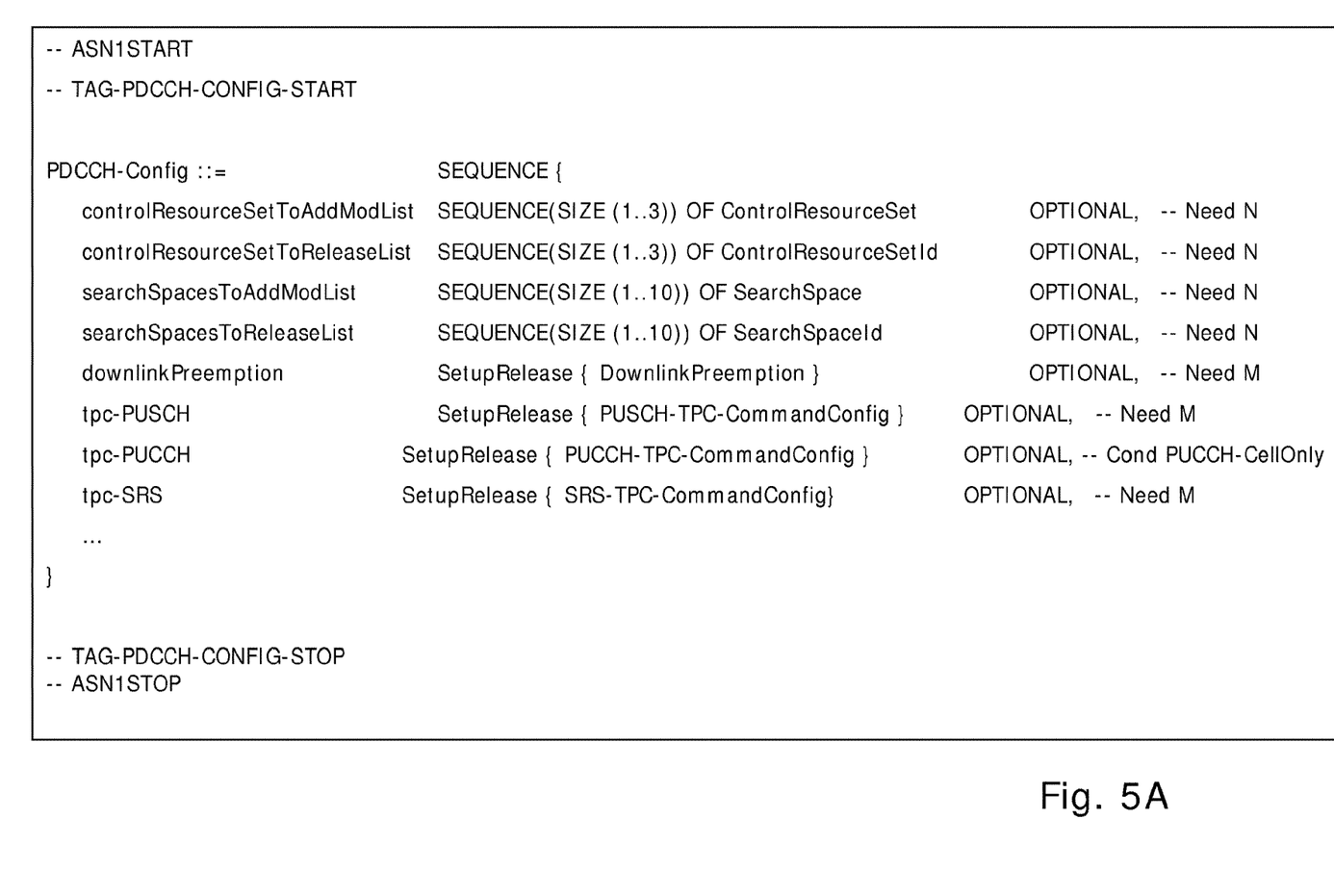
FIG. 5A shows PDCCH-Config as defined in TS 38.331.

For reference, in NR licensed, the PDCCH-Config defines CORESETs and their Search Spaces. The element is configured with the IEs as shown in FIG. 5A and taken from TS 38.331, (V15.5.1 (2019-04)).

Figure 5B:
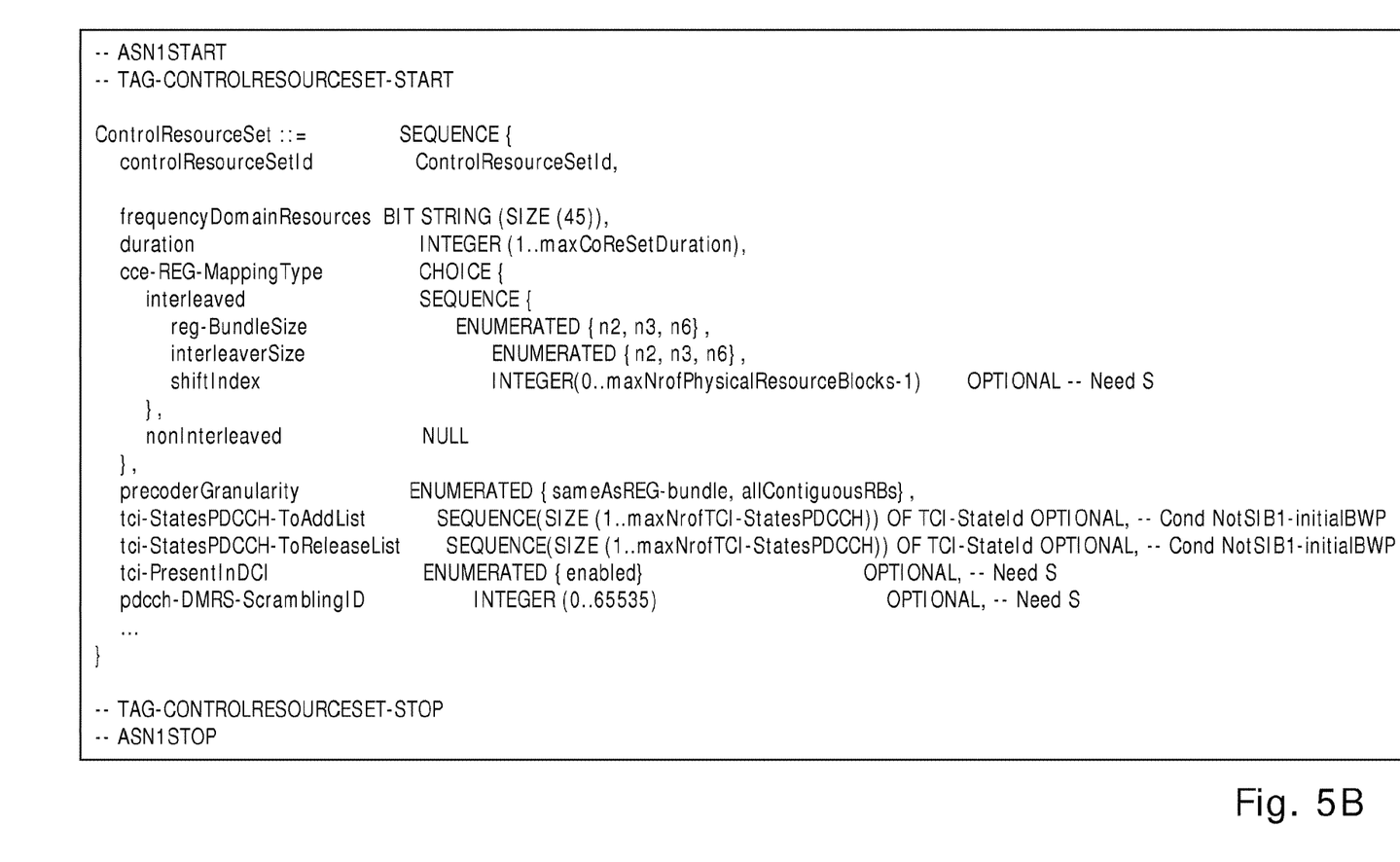
FIG. 5B shows a CORESET as defined in TS 38.331.

For reference, in NR licensed, the CORESETs is configured with the IEs as shown in FIG. 5B and taken from TS 38.331, (V15.5.1 (2019-04)).

Figure 5C:
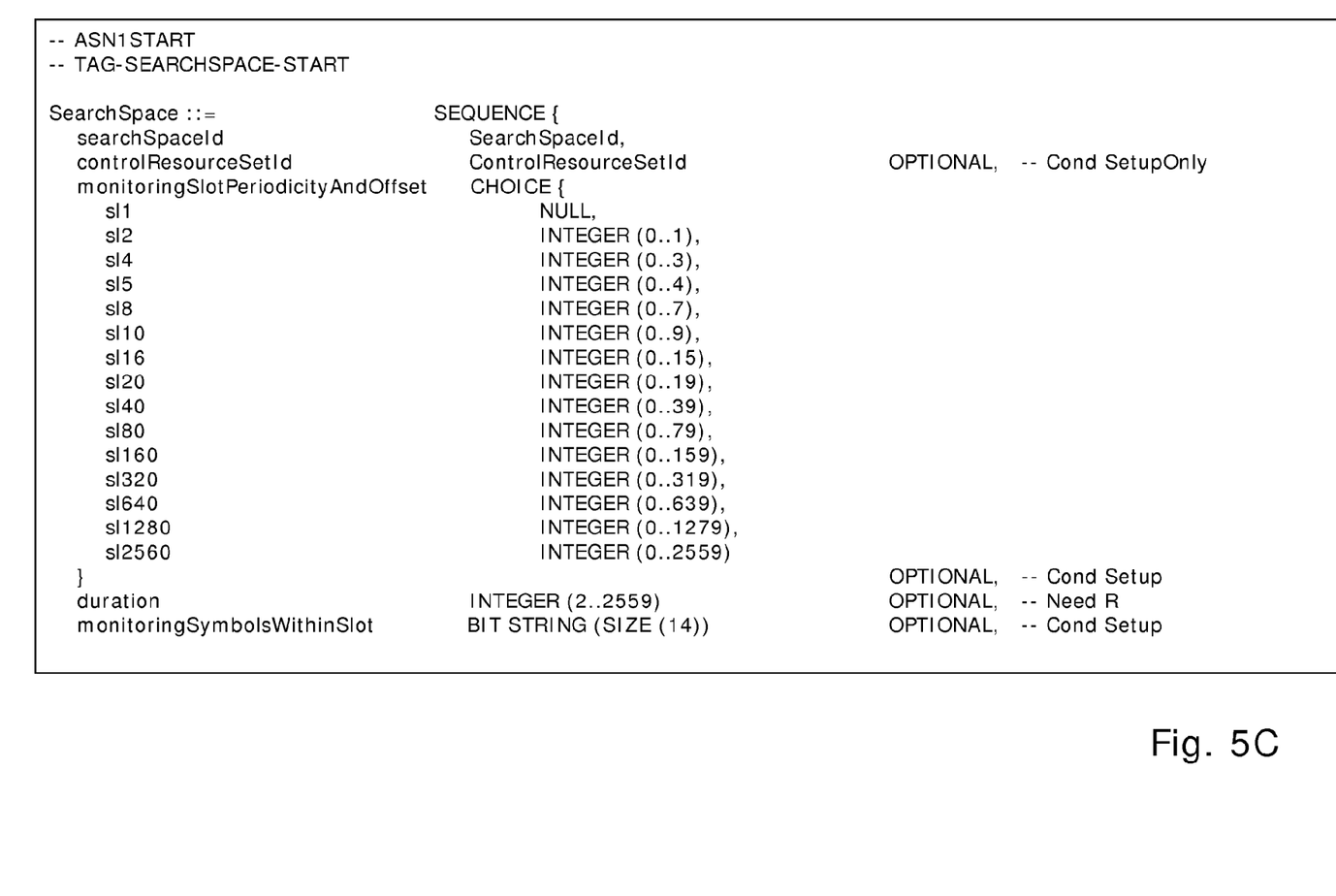
FIG. 5C shows a search space of the CORESET as defined in TS 38.331.

For reference, in NR licensed, the Search space of the CORESET are configured with the IEs as shown in FIG. 5C and taken from TS 38.331, (V15.5.1 (2019-04)). Particularly notice that in R15 Search space can be associated with only one CORESET.

In the following, as a background, NR-U wideband operation is described.

For NR-unlicensed wideband (larger than 20 MHz) carrier the following scenario is assumed:

Operation on 5 GHz unlicensed spectrum.

A large FFT size, such as 4 k FFT may be assumed for (licensed band) NR. The maximum number of PRBs per BWP in Rel-15 is 275. The assumption behind is that UE implementation is based on 4 k FFT (275 PRB*12 subcarriers/PRB=3300 subcarriers).

A large SCS, such as 30 kHz or 60 kHz

It is noted that example embodiments are not limited to the above-described values. For example, the techniques described in the following example embodiments could be applied equally well for 6 GHz unlicensed band scenario. Moreover, also a 15 kHz SCS can be considered. It supports 40 MHz BWP size with 4 k FFT.

For the purpose of this description, the following terminology is defined: Carrier bandwidth: the NR carrier bandwidth, such as 40 MHz, 80 MHz or 160 MHz, see FIG. 3 described in the following.

Sub-band: one (or possibly multiple adjacent) channel(s) on an unlicensed carrier, typically having a bandwidth of 20 MHz. Sub-band is aligned with the bandwidth of single LBT.

Figure 3:
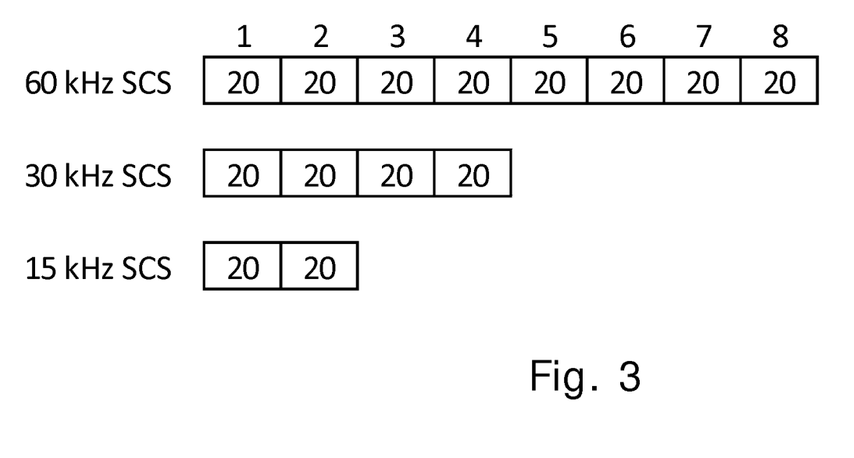
FIG. 3 illustrates possible NR BWs for 4 k FFT and different subcarrier spacings.

FIG. 3 shows possible carrier bandwidth capabilities for such scenario assuming 4 k FFT, where each carrier bandwidth comprises multiple 20 MHz sub-bands. For the case of 8k FFT, the number of sub-bands supported double compared to FIG. 3.

A DL scenario is considered. When operating according to NR-U scenario, gNB must perform LBT before it can start transmitting DL Tx burst in the cell. To meet regulatory requirements and to ensure fair coexistence with other systems operating on different combinations of LBT sub-bands, also NR unlicensed should support per sub-band LBT, e.g. with 20 MHz resolution in 5 GHz unlicensed spectrum. This has already been agreed in RAN1 #92 bis (see agreement below). The practical implementation of sub-band LBT is beyond the scope of this description.

In particular, it is agreed that, as a baseline for study: If absence of Wi-Fi cannot be guaranteed (e.g. by regulation) in the band (sub-7 GHz) where NR-U is operating, the NR-U operating bandwidth is an integer multiple of 20 MHz. Furthermore, at least for band where absence of Wi-Fi cannot be guaranteed (e.g. by regulation), LBT can be performed in units of 20 MHz. Details on how to perform LBT for as single carrier with bandwidth greater than 20 MHz, i.e., integer multiples of 20 MHz, are not specified yet.

Figure 4:
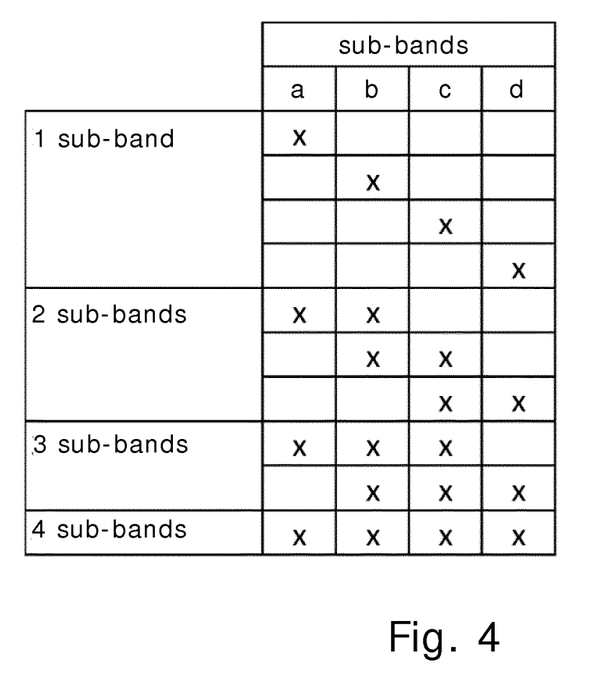
FIG. 4 illustrates possible combinations of contiguous transmission BW for gNB, carrier BW=80 MHz, sub-band BW=20 MHz.

FIG. 4 shows possible transmission bandwidth combinations for gNB after sub-band specific LBT. This example assumes 80 MHz carrier bandwidth, and contiguous allocation of 20 MHz sub-bands, although non-contiguous combination of the channels could be allowed.

Due to the sub-band specific LBT, prior to transmitting on the sub-bands that are available, the gNB may need to adjust the transmission bandwidth (Tx BW) configuration, including RF settings (center frequency, analog filters) in order to meet the regulatory rules defined for the out-of-band emissions. The gNB may decide on and perform the transmission bandwidth adaptation during the LBT process, although the details of gNB BW adaptation are outside of the scope of this description. However, for the purpose of this description, the transmission bandwidth (TX BW) is defined as a specific term, namely as the part of the spectrum on which the gNB actually transmits after LBT and consequent COT or its parts. As said, TX BW may be equal to the carrier BW or it is a portion of carrier BW (one or more sub-bands) based on the outcome of LBT.

If the majority view is agreed in RAN1 #97, the number of supported CORESETs per BWP will need to be increased at least by a factor of two to 4-6 CORESETs, to be able to meaningfully operate with a 80 MHz BWP. However, there are only 10 search spaces available per BWP (based on NR Rel-15 operation). Allowed number of search spaces would need to be increased as well (at least doubled). However, the increase of number of search spaces per BWP is not a good way to go, because it would increase significantly PDCCH candidate mapping algorithm complexity even further, please see TS38.213 end of section 10.1.

Therefore, according to example embodiments, the core of the issue is tackled and a DL control channel structure is proposed, where one search space can be mapped into multiple CORESETs within a BWP.

It is noted that COT mentioned above means channel occupancy time. A starting point of the COT may be the start of the transmission of the PDCCH or other signal after LBT. The maximum duration of the COT may depend on regulatory rules. The actual duration of the COT may vary depending on the configuration and/or gNB scheduling. A gNB acquired COT may contain only DL portion, or it may cover both DL and UL. gNB acquired COT may contain single or multiple DL and UL portion(s). It is noted that some literature use the term "transmission opportunity (TXOP)" for a similar purpose of defining a time interval when the device (such as gNB) occupies the channel.

Some example embodiments of the present application aim to overcome the above problem.

In the following, a general overview of some example embodiments is described by referring to FIGS. 1A, 1B, 2A and 2b.

Figure 1A:
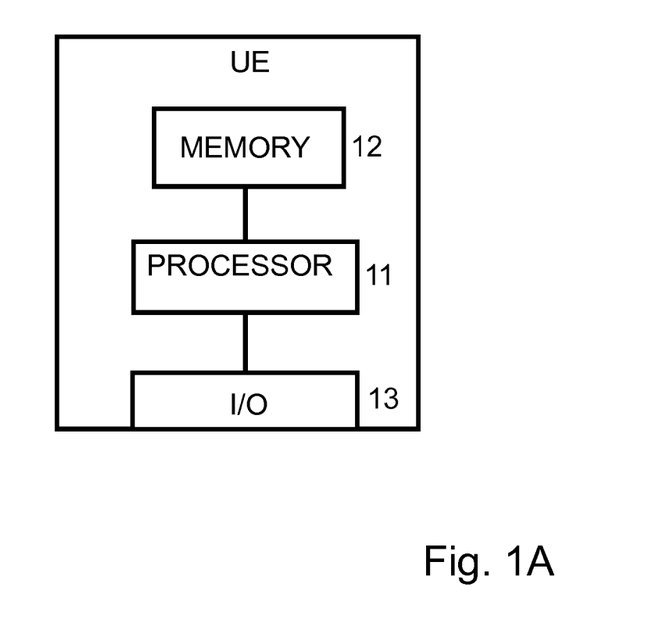
FIG. 1A shows a UE 1 according to an example embodiment.
Figure 1B:
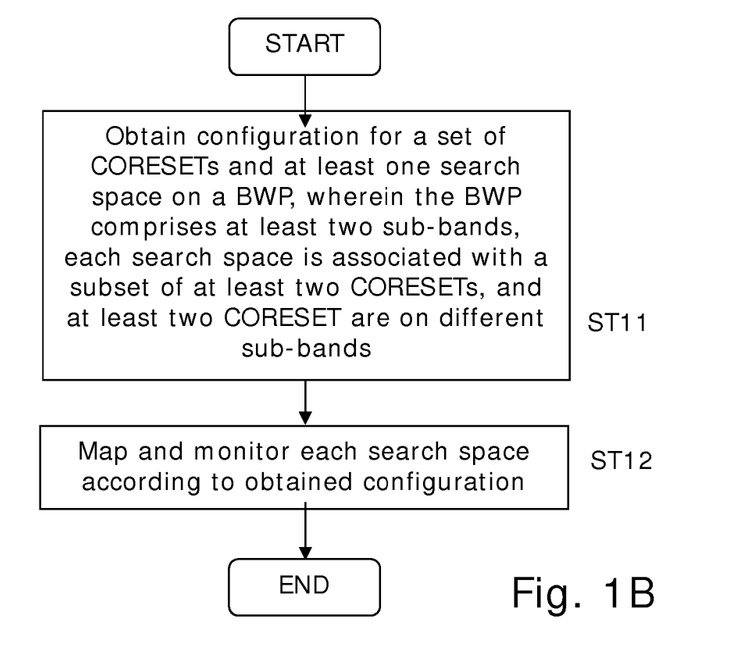
FIG. 1B shows a procedure carried out by the UE 1 according to an example embodiment.

In particular, FIG. 1A shows an UE 1 as an example for a first apparatus according to the present example embodiment. However, the invention is not limited to an UE, but can be any kind of terminal device. For example, it can be also Mobile Termination (MT) part of a relay node (Integrated Access and Backhaul (IAB) node according to NR 3GPP terminology). FIG. 1B illustrates a process carried out by the UE 1.

The UE 1 comprises at least one processor 11 and at least one memory 12 including computer program code. The at least one processor 11, with the at least one memory 12 and the computer program code, is configured to cause the apparatus to perform: obtaining (step ST11 in FIG. 1A) a configuration for a set of control resource sets (e.g., CORESETs) and at least one search space on a bandwidth part, wherein the bandwidth part comprises at least two sub-bands, each search space is associated with a subset of at least two control resource sets, and at least two control resource sets are on a different sub-band, and mapping and monitoring (ST12 in FIG. 2a) each search space according to the obtained configuration.

Figure 2A:
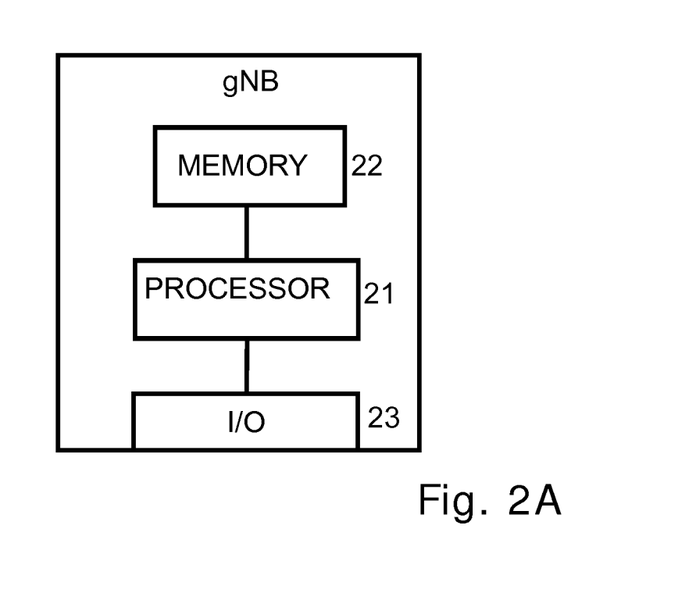
FIG. 2A shows a gNB 2 according to an example embodiment.
Figure 2B:
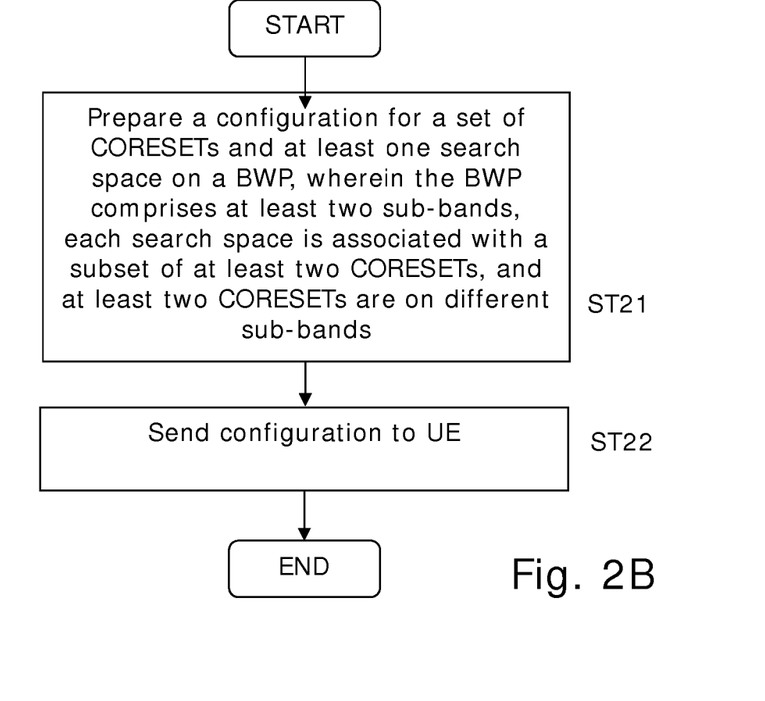
FIG. 2B shows a procedure carried out by the gNB 2 according to an example embodiment.

FIG. 2A shows an gNB 2 as an example for a second apparatus according to the present example embodiment. However, the invention is not limited to an gNB, but can be any kind of network control device or element. For example, it can be also Distributed Unit (DU) part of a relay node (IAB node according to NR 3GPP terminology). FIG. 1B illustrates a process carried out by the gNB 2.

The gNB 2 comprises at least one processor 21 and at least one memory 22 including computer program code. The at least one processor 21, with the at least one memory 22 and the computer program code, is configured to cause the apparatus to perform: preparing (ST21 in FIG. 2B) a configuration for a set of control resource sets (e.g., CORESETs) and at least one search space on a bandwidth part, wherein the bandwidth part comprises at least two sub-bands, each search space is associated with a subset of at least two control resource sets, and at least two control resource sets are on different sub-bands, and sending (ST22 in FIG. 2B) the configuration to a user equipment (e.g., UE 1 shown in FIG. 1A).

The UE 1 may further comprise an I/O unit 13, which is capable of transmitting to/receiving from the gNB 2 via a radio network. Likewise, the gNB 2 may further comprise an I/O unit 23, which is capable of transmitting to/receiving from the UE 1 via the radio network, and may also be capable to provide a connection to a core network.

Thus, according to some example embodiments, a specific configuration of search space associated with CORSETs is provided, so that it is possible to enable one DL control signaling search space (SS) to be associated with multiple CORESETs.

Moreover, the gNB or the corresponding network control element may perform the following procedures:
  detecting whether a channel is vacant (e.g., performing an LBT process),
  determining, when it is detected that a channel is vacant (the LBT is successful) for at least one sub-band, that a channel occupancy time (COT) has started,
  determining a transmission bandwidth for the current channel occupancy time (e.g., determining the number of sub-bands for the current COT),
  determining an association between search space and control resource set for at least one search space and the user equipment, and
  transmitting at least one physical downlink control channel (PDCCH) for the user equipment based on the determined association between search space and control resource set.

In the following, some example embodiments are described in more detail.

According to example embodiments, it is proposed to enable one DL control signalling search space (SS) to be associated with multiple CORESETs and building on this assumption, two mechanisms are proposed to enable adaptation of PDCCH capacity to a variable number of LBT sub-bands (that are used e.g. depending on a gNB's scheduling decisions and/or on the success of LBT) within the COT. More specifically, according example embodiments, the sub-band, on which a given search space is mapped based on configuration, depends on the outcome of scheduling and/or LBT operation, i.e. which LBT sub-bands are in use. In the following novel rules for such scheduling-dependent search space mapping are presented.

UE's method can be defined as follows:

The UE receives a configuration for a set of CORESETs and for one or more search spaces on a (NR-U) BWP. In this configuration, each said search space is associated with a subset of one or more CORESETs belonging to the said set of CORESETs, where each associated CORESET is on a different LBT sub-band. Moreover, the CORESETs that the search spaces are associated with may be ranked based on priority (i.e. primary, secondary, etc.).

Furthermore, the UE determines LBT sub-bands within the transmission bandwidth of a gNB COT. This may be done e.g. based on indication received from the gNB (such as GC-PDCCH or unicast PDCCH), and/or by UE by blind detection DL DMRS (e.g. PDCCH DMRS). The search space carrying GC-PDCCH may be mapped to all associated CORESETs (one-to-all) that are transmitted. This will avoid a chicken-and-egg problem related to detection of GC-PDCCH or unicast PDCCH, before transmission BW is known to the UE.

Moreover, the UE determines on which of the one or more associated CORESETs to monitor each search space depending on the LBT sub-bands within the transmission bandwidth of the gNB COT. For this, the two following options 1 and 2 may be applied.

According to option 1, the search space-to-CORESET association depends on the combination of LBT sub-bands that the gNB transmits. A given search space is monitored on the primary CORESET if gNB is transmitting on the primary CORESET's corresponding LBT sub-band; otherwise the search space is monitored on the secondary CORESET if gNB is transmitting on the secondary CORESET's corresponding LBT sub-band, etc. In this case, the UE monitors each search space only in one CORESET at given time.

In an example embodiment there is a number of associated CORESTs defined for certain search space (the number being smaller than the number of sub-bands of the BWP), e.g. the primary CORESET and the secondary CORESET. If these CORESETs are not available (due to LBT) then the related search space is dropped (i.e. not mapped, and not monitored by UE).

According to option 2, a search space can be associated with multiple CORESETs. The search space is mapped to all associated CORESET's, if gNB is transmitting on the LBT sub-band corresponding to the CORESET, and/or if number of LBT sub-bands on which gNB transmits is equal to the value(s) of N configured for the search space. It is noted that the one-to-all mapping of the search space carrying GC-PDCCH (discussed above) is an example embodiment of Option 2 (with N=1, 2, 3, 4). N determines the number of sub-bands that has to be transmitted to map the certain search space.

In the following, the terms "association" and "mapping" as used in the present description are described. In particular an association between CORESETS/LBT-sub-bands and SSs is predetermined or based on configuration, whereas mapping depends on the CORESETs (and LBT-sub-bands) that are transmitted at a given point in time. That is, the association is semi-static or fixed, while mapping is dynamic (based on transmission of CORESETS at a given point in time).

Control channel search space mapping, i.e. allocation, is a procedure that involves determining which of the plurality of control channel candidates (i.e. the search spaces) may contain control information for a specific UE or group of UEs. A given UE is only expected to only monitor the mapped control channel candidates and search spaces.

Both the gNB and the UE perform the mapping in the same way.

Furthermore, regarding the term "search spaces" it is noted that this term is in line with RAN2 terminology. However, it is noted that in RAN1 terminology, the same is defined as search-space sets. Example embodiments of the present application refer to both terms. Both terms cover scenarios with one or multiple aggregation levels per referred term.

In the following, the options 1 and 2 are described in more detail.

As mentioned above, in option 1, the search space-to-CORESET association depends on combination of LBT sub-bands that the gNB transmits. According to proposed example embodiments, a UE would be configured for example with four search spaces and four CORESETs, where each CORESET is on a different LBT sub-band. CORESET #0 is located on LBT sub-band #0, CORESET #1 is located on LBT sub-band #1, etc. This provides load balancing opportunities for gNB when mapping search spaces among different sub-bands.

The association of search space (SS) to CORESETs could be for example as follows:

|      | Primary associated CORESET | Secondary associated CORESET | Tertiary associated CORESET |
| ---- | -------------------------- | ---------------------------- | --------------------------- |
| SS#0 | CORESET #1                 | CORESET #2                   | CORESET #3                  |
| SS#1 | CORESET #2                 | CORESET #1                   | CORESET #4                  |
| SS#2 | CORESET #3                 | CORESET #4                   | CORESET #1                  |
| SS#3 | CORESET #4                 | CORESET #3                   | CORESET #2                  |

The example shows for each search space (SS), the three CORESETs on which the search space can be mapped and transmitted. If the primary CORESET for a given SS is not transmitted, the SS is mapped onto the secondary associated CORESET, and if also the secondary associated CORESET is not transmitted, SS is mapped transmitted on the tertiary associated CORESET. If none of the CORESETs associated with a give SS are transmitted, CORESET is not mapped, i.e. is omitted or dropped.

If for example LBT is positive for LBT sub-band #1 (where CORESET #1 is), and LBT sub-band #3 (where CORESET #3 is), and gNB transmits on LBT sub-band #1 and #3, then SS #0 and SS #1 will be mapped to CORESET #1, and SS #2 and SS #3 will be mapped to CORESET #3.

In option 2, the search space-to-CORESET association is independent of the transmitted CORESETs (and corresponding LBT sub-bands) priority, i.e. if a given SS is mapped (that is, transmitted, instead of omitted or dropped), it will always be mapped on one or more predetermined CORESETs if gNB is transmitting on the CORESETs corresponding LBT sub-bands. Whether the search space is mapped on a given LBT sub-band or not may depend on whether the number of transmitted LBT sub-bands is equal to a preconfigured values $N=[n\_1, n\_2, \ldots]$ for the search space.

In other words, it is assumed that the number of transmitted sub-bands within gNB COT is M. A set of numbers $N=[n\_1, n\_2, \ldots]$ are configured values of N for a search-space. Then, the UE maps the search-space "for monitoring" to a CORESET only if M equals to one of the configured values of N.

Alternatively, N can be defined as single number, which denotes the minimum number of CORESETs or LBT sub-bands that need to be transmitted for the given search-space to be mapped and transmitted. If gNB configures N=2, the search space is mapped if M=2, 3 or 4.

According to proposed example embodiments, a UE would be configured, for example, with three SS sets and four CORESETs, where each CORESET is located on a different LBT sub-band. CORESET #0 is located on LBT sub-band #0, CORESET #1 on LBT sub-band #1, etc. This provides adaptability of PDCCH candidate capacity to LBT outcome of BWP LBT sub-bands (the more sub-bands are available, the more PDCCH capacity is needed).

In the following table, the different search spaces in connection with associated CORESETs and preconfigured values of N for search space are shown:

|      | Associated CORESETs | Preconfigured values of N for search space |
| ---- | ------------------- | ------------------------------------------ |
| SS#0 | #1, 2, 3, 4         | 3, 4                                       |
| SS#1 | #1, 2               | 1, 2                                       |
| SS#2 | #3, 4               | 1, 2                                       |

If for example gNB transmits on two LBT sub-bands corresponding to CORESET #1 and CORESET #3, i.e. on sub-bands #1 and #3, respectively, then SS #1 will be mapped to CORESET #1, and SS #2 will be mapped to CORESET #3. SS #0 will not be mapped/transmitted, because it is mapped only if N=3 or 4 sub-bands are transmitted by gNB.

In SS #0 a gNB may configure 2 PDCCH candidates per sub-band, and there would be 6 or 8 (depending on number of transmitted LBT sub-bands N) PDCCH candidates total for the UE if SS #0 is mapped. On the other hand, SS #1 may be configured with 4 PDCCH candidates, there would be 4 or 8 (depending on number of transmitted LBT sub-bands N) PDCCH candidates total. This enables adaptation of PDCCH capacity, and such enables frequency domain multiplexing of UEs within LBT sub-bands acquired by gNB in a particular COT or its part.

In the following, some further example embodiments are described, which are based on the example embodiments described above.

For example, according to an example embodiment, associated CORESETs share a set of common parameters, e.g. such as TCI state(s) or CORESET length, the number of PRBs, DMRS strategy, interleaving strategy and/or REG bundle size. According to an example embodiment based thereon, the only difference between the associated CORESETs may be the frequency domain location within the wideband BWP (in other words, each associated CORESET may locate on separate sub-bands). The sharing a set of common parameters may reduce configuration and implementation complexity.

Moreover, according to some example embodiments, different Search spaces may use different PDCCH monitoring strategies. For example, a DCI carrying GC-PDCCH (indicating the LBT outcome) may be mapped to all sub-bands/associated CORESETs whereas dedicated search spaces may use option 1 or option 2 described above.

The following advantages can be achieved by the measures as defined in the example embodiments described above.

In particular, the need to configure too many different search spaces is reduced.

Moreover, option 1 allows load balancing for search spaces among different sub-bands.

Option 1 and Option 2 provide adaptability of PDCCH candidate capacity to LBT outcome of BWP LBT sub-bands (the more sub-bands are available, the more PDCCH capacity is needed).

Option 2 supports also one-to-all mapping.

The solution according to the example embodiments is compatible to NR licensed, potentially with some restrictions on similarity of associated CORESET parameters.

Names of network elements, protocols, and methods are based on current standards. In other versions or other technologies, the names of these network elements and/or protocols and/or methods may be different, as long as they provide a corresponding functionality.

In general, the example embodiments may be implemented by computer software stored in the memory (memory resources, memory circuitry) 12, 22 and executable by the processor (processing resources, processing circuitry) 11, 21 or by hardware, or by a combination of software and/or firmware and hardware.

As used in this application, the term "circuitry" refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The memory (memory resources, memory circuitry) 12, 22 may be of any type suitable to the local technical environment and may be implemented using any suitable data storage technology, such as semiconductor based memory devices, magnetic memory devices and systems, optical memory devices and systems, fixed memory and removable memory, and non-transitory computer-readable media. The processor (processing resources, processing circuitry) 11, 21 may be of any type suitable to the local technical environment, and may include one or more of general purpose computers, special purpose computers, microprocessors, digital signal processors (DSPs) and processors based on a multi core processor architecture, as non-limiting examples.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. An apparatus comprising
at least one processor and at least one memory including computer program code, the at least one memory and the computer program code configured to, with the at least one processor, cause the apparatus at least to perform:
obtaining, from a network control element, a configuration for a set of control resource sets and at least one search space on a bandwidth part, wherein the bandwidth part comprises at least two sub-bands, respective search spaces are associated with multiple control resource sets that comprise a subset of at least two control resource sets, and the at least two control resource sets are on different sub-bands, and wherein respective ones of the set of control resource sets are associated with different listen-before-talk (LBT) sub-bands, wherein the set of control resource sets share a common set of parameters comprising at least: a control resource set length and a transmission configuration indication state; and
according to the configuration that was obtained, mapping and monitoring the at least one search space on the control resource sets associated therewith responsive to a number of sub-bands, on which the network control element transmits, being equal to a preconfigured value for the at least one search space.

2. The apparatus according to claim 1, wherein the at least one memory and the computer program code are configured to, with the at least one processor, cause the apparatus to further perform:
determining the sub-bands within the transmission bandwidth of a channel occupation time of the network control element based on an indication received from the network control element and/or by detecting a downlink demodulation reference signal.

3. The apparatus according to claim 2, wherein
the indication received from the network control element is a group-common physical downlink control channel, and
the at least one memory and the computer program code are configured to, with the at least one processor, cause the apparatus to further perform:
mapping the search space carrying the group-common physical downlink control channel to all associated control resource sets.

4. The apparatus according to claim 2, wherein the at least one memory and the computer program code are configured to, with the at least one processor, cause the apparatus to further perform:
determine on which of the one or more associated control resource sets to map and monitor a certain search space depending on the sub-bands within the transmission bandwidth of a channel occupation time of the network control element.

5. The apparatus according to claim 4, wherein
the association of the search space to the control resource sets depends on a combination of sub-bands that the network control element transmits, and
the at least one memory and the computer program code are configured to, with the at least one processor, cause the apparatus to further perform:
mapping a certain search space to a control resource set with the highest priority among transmitted associated control resource sets.

6. The apparatus according to claim 5, wherein
the associated control resource sets are defined for certain search space and the number thereof is smaller than the number of sub-bands of the bandwidth part, and
the at least one memory and the computer program code are configured to, with the at least one processor, cause the apparatus to further perform:
dropping the certain search space when these control resource sets are not available.

7. The apparatus according to claim 4, wherein a search space is associated with multiple control resource sets, and
the at least one memory and the computer program code are configured to, with the at least one processor, cause the apparatus to further perform:
mapping and monitoring the search space on all associated control resource sets if the network control element is transmitting on the sub-band corresponding to the control resource set.

8. The apparatus according to claim 1, wherein the control resource sets that a certain search space is associated with are ranked based on a priority.

9. The apparatus according to claim 1, wherein the associated control resource sets differ only in a frequency domain location within the bandwidth part.

10. The apparatus according to claim 1, wherein the at least one memory and the computer program code are configured to, with the at least one processor, cause the apparatus to further perform:
applying different mapping and monitoring strategies for different search spaces.

11. The apparatus according to claim 1, wherein the at least one memory and the computer program code are configured to, with the at least one processor, cause the apparatus to further perform:
obtaining the configuration by receiving the configuration from a network control element.

12. The apparatus according to claim 1, wherein the common set of parameters further comprises: a number of physical resource blocks, a demodulation reference signal strategy, an interleaving strategy and a resource element group bundle size.

13. The apparatus according to claim 1, wherein the mapping for respective monitoring occasions of the search space is based on an outcome of scheduling and a listen-before-talk (LBT) process on a sub-band associated with one or more control resource sets of the set of control resource sets.

14. An apparatus comprising
at least one processor and at least one memory including computer program code, the at least one memory and the computer program code configured to, with the at least one processor, cause the apparatus at least to perform:
preparing a configuration for a set of control resource sets, comprising at least a primary control resource set and a secondary control resource set, and at least one search space on a bandwidth part, wherein the bandwidth part comprises at least two sub-bands, respective search spaces are associated with multiple control resource sets that comprise a subset of at least two control resource sets, and the at least two control resource sets are equally distributed among different sub-bands to provide load balancing for the at least one search space, wherein the set of control resource sets share a common set of parameters comprising at least: a control resource set length and a transmission configuration indication state; and
transmitting, after a listen-before-talk (LBT) process on a sub-band associated with the primary control resource set or the secondary control resource set, the configuration to a user equipment.

15. The apparatus according to claim 14, wherein the at least one memory and the computer program code are configured to, with the at least one processor, cause the apparatus to further perform:
detecting whether a channel is vacant,
determining, when it is detected that a channel is vacant for at least one sub-band, that a channel occupancy time has started,
determining a transmission bandwidth for the current channel occupancy time,
determining an association between search space and control resource set for at least one search space and the user equipment, and
transmitting at least one physical downlink control channel for the user equipment based on the determined association between search space and control resource set.

16. The apparatus according to claim 14, wherein the primary control resource set and the secondary control resource set are ranked based on a priority.

17. The apparatus according to claim 14, wherein the associated control resource sets differ only in a frequency domain location within the bandwidth part.

18. A method comprising:
obtaining, at a user equipment from a network control element, a configuration for a set of control resource sets and at least one search space on a bandwidth part, wherein the bandwidth part comprises at least two sub-bands, respective search spaces are associated with multiple control resource sets that comprise a subset of at least two control resource sets, and the at least two control resource sets are on different sub-bands, and wherein respective ones of the set of control resource sets are associated with different listen-before-talk (LBT) sub-bands, wherein the set of control resource sets share a common set of parameters comprising at least: a control resource set length and a transmission configuration indication state; and according to the configuration that was obtained, mapping and monitoring the at least one search space on the control resource sets associated therewith responsive to a number of sub-bands, on which the network control element transmits, being equal to a preconfigured value for the at least one search space.

* * * * *